(12) United States Patent
Boguhn et al.

(10) Patent No.: US 10,378,968 B2
(45) Date of Patent: Aug. 13, 2019

(54) APPARATUS FOR DETERMINING AND/OR MONITORING A PROCESS VARIABLE

(75) Inventors: Dirk Boguhn, Munich (DE); Torsten Iselt, Kempten (DE); Larry De Guzmann, Singapore (SG)

(73) Assignee: ENDRESS + HAUSER WETZER GMBH + CO. KG, Nesselwang (DE)

( * ) Notice: Subject to any disclaimer, the term of this patent is extended or adjusted under 35 U.S.C. 154(b) by 147 days.

(21) Appl. No.: 13/129,862

(22) PCT Filed: Nov. 9, 2009

(86) PCT No.: PCT/EP2009/064801
§ 371 (c)(1),
(2), (4) Date: May 18, 2011

(87) PCT Pub. No.: WO2010/057793
PCT Pub. Date: May 27, 2010

(65) Prior Publication Data
US 2011/0222583 A1 Sep. 15, 2011

(30) Foreign Application Priority Data

Nov. 19, 2008 (DE) .................. 10 2008 043 862
May 20, 2009 (DE) .................. 10 2009 026 402

(51) Int. Cl.
*G01K 1/00* (2006.01)
*G01K 7/00* (2006.01)
(Continued)

(52) U.S. Cl.
CPC .............. *G01K 7/023* (2013.01); *B23K 26/22* (2013.01); *G01K 7/16* (2013.01); *H01R 4/5016* (2013.01);
(Continued)

(58) Field of Classification Search
USPC ......................................... 374/183, 208, 148
See application file for complete search history.

(56) References Cited

U.S. PATENT DOCUMENTS 3,754,201 A * 8/1973 Adams ............................ 338/28
4,388,523 A * 6/1983 Keep et al. .................... 219/541
(Continued)

FOREIGN PATENT DOCUMENTS

DE   198 04 669 A1   8/1999
DE   198 40 306 A1   3/2000
(Continued)

OTHER PUBLICATIONS

English translation of the International Preliminary Report.

*Primary Examiner* — Mirellys Jagan
(74) *Attorney, Agent, or Firm* — Bacon & Thomas, PLLC

(57) ABSTRACT

An apparatus for determining and/or monitoring at least one process variable. The apparatus includes: at least one sensor element, which is connected to at least one connection line; and at least one conductor element, which is connected to the connection line. At least one formed part is provided; that at least one opening is provided in the formed part for introduction of the connection line; that at least one opening is provided in the formed part for introduction of the conductor element; and that there is provided in the formed part at least one chamber section, into which open the opening for introduction of the connection line and the opening for introduction of the conductor element.

10 Claims, 3 Drawing Sheets

(51) Int. Cl.
  *G01K 7/02* (2006.01)
  *B23K 26/22* (2006.01)
  *G01K 7/16* (2006.01)
  *H01R 4/50* (2006.01)
  *H01R 43/02* (2006.01)
  *H01R 13/66* (2006.01)

(52) U.S. Cl.
  CPC ..... *H01R 43/0221* (2013.01); *H01R 13/6683* (2013.01)

(56) References Cited

U.S. PATENT DOCUMENTS

| | | |
|---|---|---|
| 5,489,748 A | 2/1996 | Yee |
| 6,246,000 B1* | 6/2001 | Wehrmann et al. ........ 174/74 R |
| 6,639,505 B2* | 10/2003 | Murata et al. ................. 338/25 |
| 7,303,333 B2* | 12/2007 | Yu ................................ 374/208 |
| 7,458,718 B2* | 12/2008 | Krishnamurthy et al. ... 374/208 |
| 8,864,375 B2* | 10/2014 | Abe et al. ..................... 374/163 |
| 2006/0176931 A1* | 8/2006 | Miyahara et al. ............ 374/208 |
| 2009/0016409 A1* | 1/2009 | Mizoguchi et al. .......... 374/185 |

FOREIGN PATENT DOCUMENTS

| | | |
|---|---|---|
| DE | 102 36 036 A1 | 2/2004 |
| DE | 10 2005 009 927 | 12/2005 |
| DE | 102007000073 | 10/2007 |
| EP | 1 278 277 A1 | 1/2003 |

\* cited by examiner

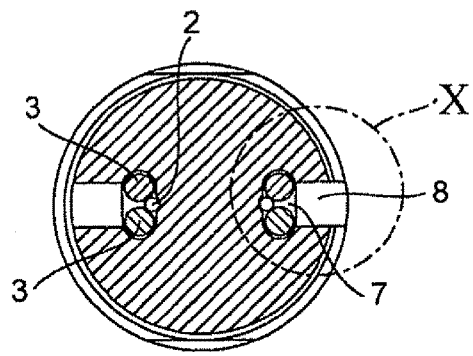
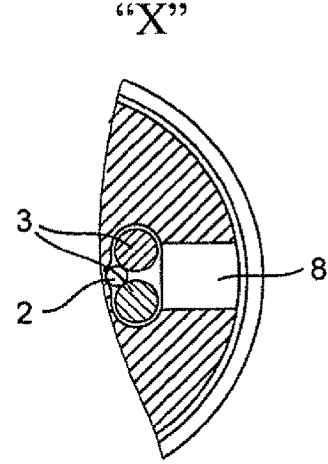
Fig. 3a  Fig. 3b
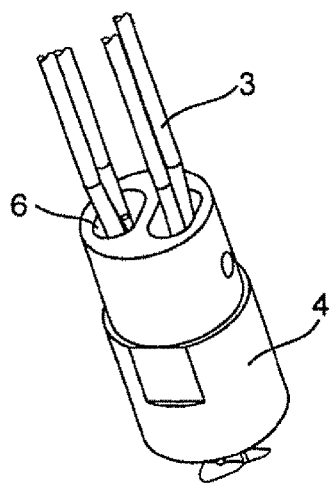
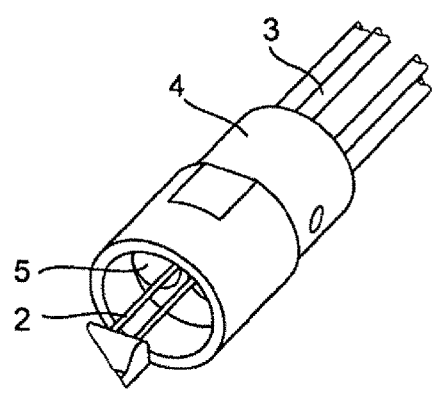
Fig. 4a  Fig. 4b

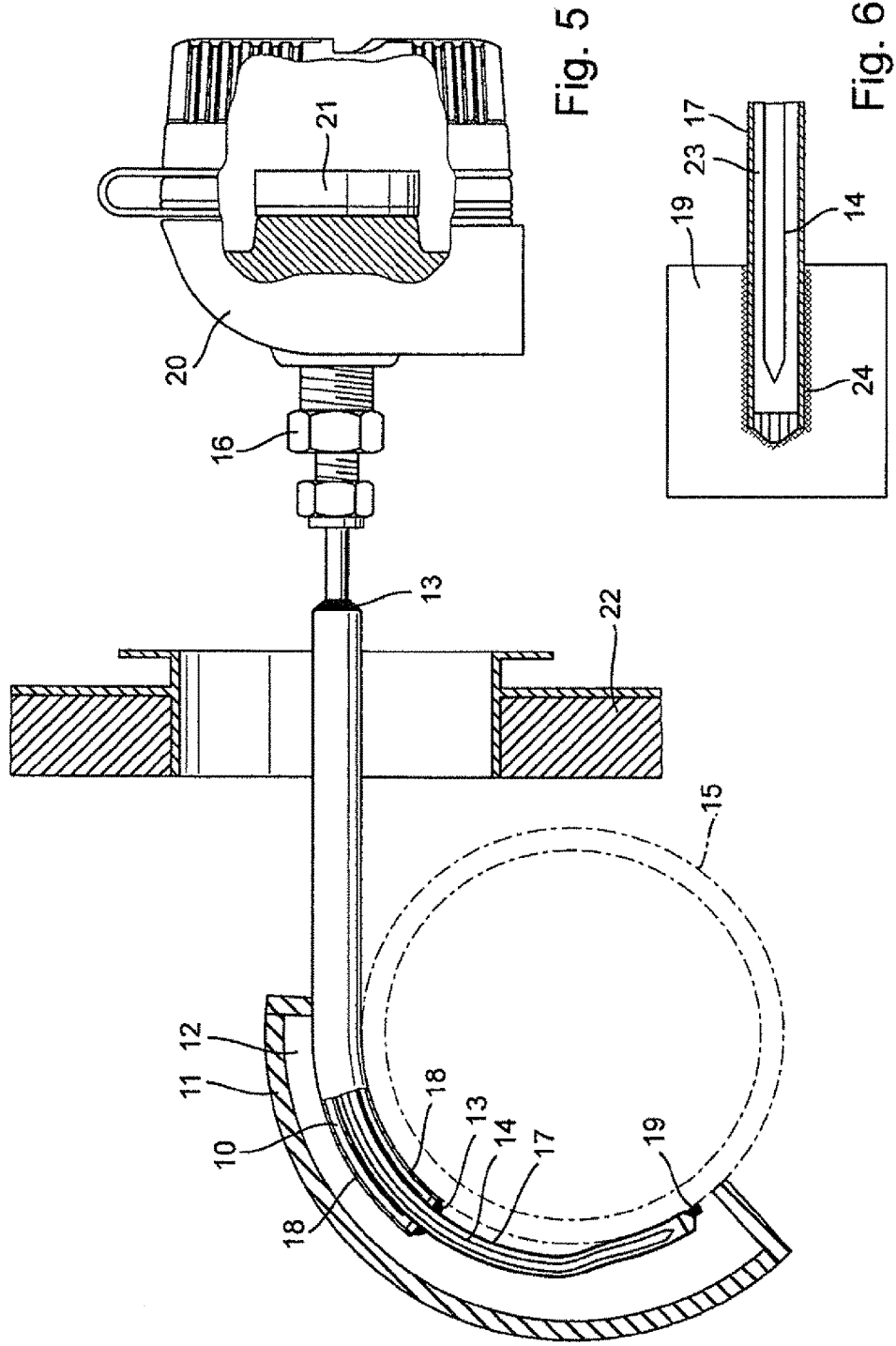

APPARATUS FOR DETERMINING AND/OR MONITORING A PROCESS VARIABLE

TECHNICAL FIELD

The invention relates to an apparatus for determining and/or monitoring at least one process variable. The apparatus includes: at least one sensor element, which is connected to at least one connection line; and at least one conductor element, which is connected to the connection line. The process variable is, for example, temperature, fill level, density, flow, viscosity, humidity or pH value.

BACKGROUND DISCUSSION

Industrial temperature measuring devices or the components relevant to measuring are frequently constructed using so called mineral insulated lines (another name is: sheathed lines), especially for higher operating temperatures. Such lines contain in their interior, surrounded by a metal sheath, two, four or also more solid metal conductors of copper, nickel, nickel chromium or the like, which are embedded in a very compact ceramic powder (MgO, $Al_2O_3$), which electrically insulates the conductors. Such a mineral insulated line is then used, in a corresponding length, for the construction of a thermometer measuring insert. The inner conductors are exposed over a certain length. Then a corresponding temperature sensor element (e.g. a Pt 100) is suitably hard soldered or welded to a two, three, or four conductor circuit and then sealed by means of additional tube pieces or metal caps, which are pushed over the sensor element and welded to the sheathed line. This process, especially the welding/soldering of the sensor element to the sheathed lead wires is, however, scarcely automatable and is usually executed manually. This leads to high costs.

Above all, the difficulties for automating lie in the defined orienting and precise positioning of the relatively thick sheathed cable wires and the clearly thinner connection wires of the sensors to one another, as well as their holder, in order to be able to manufacture a sufficiently stable welded or soldered connection. This applies even more so where, for example, in the case of resistance thermometer sensors, in three or four conductor circuits, where each set of two contacting sheathed cable wires are first bent in defined manner relative to one another before they can be welded with the third thin (sensor) wire.

SUMMARY OF THE INVENTION

An object of the invention is to provide a measuring apparatus of the type mentioned above which permits an automated manufacturing.

According to the invention, the object is achieved by features that at least one formed part is provided; that at least one opening for the introduction of the connection line is provided in the formed part; that at least one opening for the introduction of the conductor element is provided in the formed part; that in the formed part at least one chamber section is provided, into which open the opening for the introduction of the connection line and the opening for the introduction of the conductor element. The formed part here described is, in such a case, not limited to application in a measuring device or field device, but instead can also find application in other devices in which two elements are to be connected to one another. Especially, thus, also all following embodiments are not only applicable for such measuring or field devices. Thus, the connection line and the conductor element are brought together in the formed part, wherein the two meet in a chamber section.

An embodiment provides that the opening for the introduction of the connection line is essentially conical, where the tip of the cone opens into the chamber section. Such a cone facilitates the introduction of the connection line into the formed body.

An embodiment provides that the opening for the introduction of the conductor element is essentially V-shaped, where the tip of the V opens into the chamber section. The V-shaped opening is especially flattened laterally, so that the conductor element has only a small play laterally and the conductor element is preferably led only along the V.

An embodiment provides that the formed part has at least one contacting opening, which opens into the chamber section and through which the connection element and the conductor element are connectable with one another, especially by laser welding. The formed part thus has another opening, via which the connecting is implementable.

An embodiment provides that the contacting opening is a bore, which reaches from an outer surface of the formed part to the chamber section.

An embodiment provides that the conductor element is a single, or multi, line, mineral insulated cable. Thus, it is preferably a line that is known by the name, "sheathed line".

In an embodiment, the connection element and/or the conductor element are/is sheathed at least sectionally by a ceramic fiber. The sheathing with ceramic fiber can serve as a protective layer against process and/or environment related, disturbing influences on the conductor element or the connection element. Preferably in such a case, the conductor element and/or the connection element are embedded in an electrically insulating layer, which is at least partially sheathed by the ceramic fiber.

An embodiment provides that the conductor element is at least partially free of the sheathing. Thus, at least in the region of the connection with the connection line, no sheathing is provided or this is removed.

An embodiment provides that the formed part at least partially comprises a ceramic.

An embodiment provides that the formed part is essentially cylindrical.

An embodiment provides that the connection element is a wire.

An embodiment provides that the sensor element comprises at least one temperature resistance element.

An embodiment provides that the sensor element is at least partially inserted in a cap.

An embodiment provides that the cap is at least partially connected to the sheath of the conductor element.

An embodiment provides that the sensor element is at least partially embedded in a potting compound.

The manufacturing of an apparatus of the invention, thus, includes, in an embodiment, at least three working steps, where, in this example, the apparatus is a temperature measuring device:

Sensor modules are produced, in which steel caps are filled with a defined ceramic potting compound, in which an RTD sensor element is embedded and solidly surrounded thereby. In this way, among other things, the position and length of the free connection wires of the sensor element are fixed. Then an electrical and mechanical coupling of the RTD connection wires to the exposed conductor ends of the sheathed line is produced by laser welding with the assistance of the formed ceramic part mentioned above.

Finally, the sensor cap is welded to the outer sheath of the sheathed line.

The geometry and shape of the formed ceramic part is, in such case, so executed, that, especially by an easy pushing/plugging together, both the, for example, four connection wires of the sheathed line pre-bend into a V-shape as well as also the clearly thinner, little connection wire of the RTD element are so positioned that they can, thereafter, be simply welded to one another through the laterally positioned hole, especially fully automatically by laser.

Furthermore, the formed ceramic part remains in the manufactured measuring component and thus serves both as a joining and welding tool as well as later for the electrical insulation of the connection wires from one another or from the metal sheath as well as for mechanical stabilizing and for a sufficient mechanical strength and vibration resistance of the joint between the sensor element and the sheathed line wires.

BRIEF DESCRIPTION OF THE DRAWINGS

The invention will now be explained in greater detail based on the appended drawings, the figures of which show as follows:

FIGS. 3a, 3b shows a section through the embodiment of FIG. 2 and an enlarged region thereof;

FIGS. 4a, 4b shows two different perspective views of a formed part;

FIG. 5 is a schematic representation of a skin thermometer at a measuring point; and FIG. 6 is an enlarged representation of the welded contact and the thermo wires secured thereto.

DETAILED DISCUSSION IN CONJUNCTION WITH THE DRAWINGS

Figure 1:
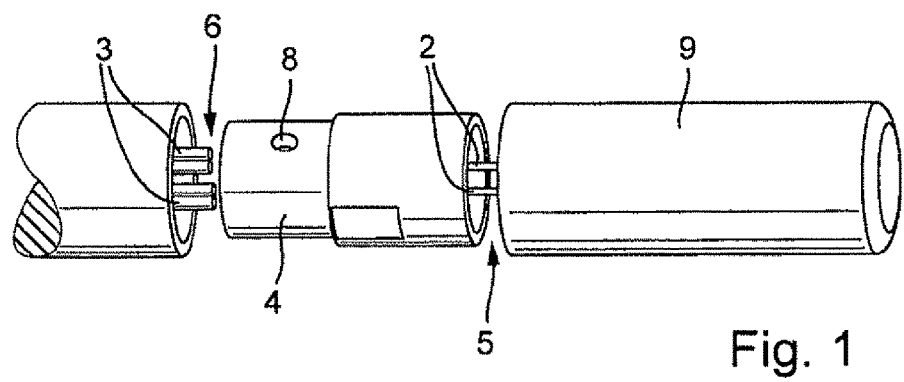
FIG. 1 is an exploded view of a section of a measuring device of the invention.

FIG. 1 shows the end region of a measuring device and some of the components of the invention facing the medium or process. The sensor element, here not visible, is located in the cap 9. For example, the sensor element serves for measuring temperature, wherein the temperature dependent electrical resistance of the sensor element is evaluated.

The sensor element is here connected to two connection lines 2, which extend out from a potting compound, which is, for example, a ceramic potting compound, located in the cap 9. The connection lines 2, most often wires, are led in the formed part 4 to the two conductor elements 3 of a sheathed line and are connected to these electrically and mechanically, for example, by means of laser beams passing through the contacting opening 8. The formed part 4 has an opening 5 for the connection lines and an opening 6 for the conductor elements. Its embodiment is described in greater detail in the following figures. After the connection lines 2 and conductor elements 3 are connected in pairs, the sheathing of the sheathed line is welded to the cap 9. Thus the formed part 4 preferably remains in the manufactured measuring device.

Figure 2:
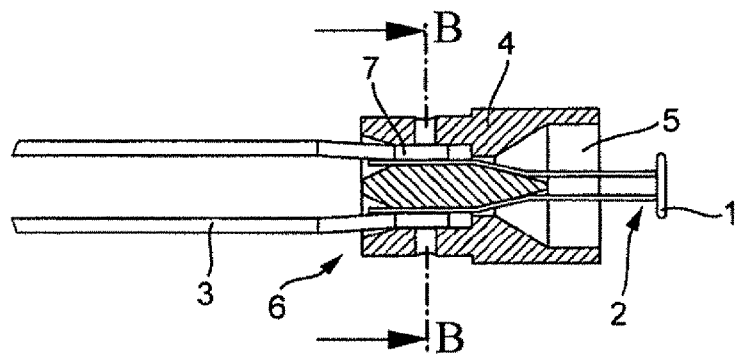
FIG. 2 is a section through a part of FIG. 1.

FIG. 2 shows a section of the formed part 4, which is comprised, for example, essentially of ceramic. Here, the conductor elements 3 are already bent by the V-shaped openings 6 of the formed part 4 for the introduction of the conductor elements. The cone shaped openings of the formed part 4 for the introduction of the connection line 5 facilitate the introduction of both connection lines 2. In such a case, the connection lines 2 and the conductor elements 3 each meet in pairs in a chamber section 7 in the interior of the formed part 4. The two contacting openings 8 for producing the mechanical and electrical connection also open into this chamber section 7.

A section along the line B-B of the arrangement of FIG. 2 and an enlarged section X therefrom are presented in FIGS. 3a and 3b. The way each of the two bent conductor elements 3 come in direct contact with their connection line 2 is shown. In such a case the size relationships are also to be noted. Each of the contacting openings 8, which, in each case, open into the chamber section 7, in which the conductor elements 3 and the connection lines 2 meet, is shown.

The openings 6, with their V-shaped structure, for the introduction of the conductor elements 3 are shown in FIG. 4a. The conductor elements are suitably brought through this V shape and thereby bent to the tip of the V. FIG. 4b shows both openings for the introduction of the connection lines 5. Here there is a cone shaped construction, so that the thin connection lines are easier to introduce.

FIG. 5 shows a schematic representation of a skin thermometer on site at a measuring point, here a blast furnace pipe 15. Measuring devices for determining temperature are applied, for example, in kilns and/or blast furnaces, process pipelines or in boilers and heaters, which use, for example, heating oil as a heating medium. The sensor, or the sensor arrangement, of the measuring apparatus can be placed, for example, in contact with the medium or with a wall of a pipeline 15, for example. A measuring apparatus for the determination of temperature by means of a device called a skin thermocouple is known from U.S. Pat. No. 5,172,979, among others. Moreover, a protective tube 18 for a temperature sensor is known from U.S. Pat. No. 4,871,263. FIG. 5 shows a measuring apparatus in which a skin thermocouple is placed on the outer wall of a blast furnace pipe 15. The skin thermocouple is composed of a thermocouple pair 14, where the thermocouple pair 14 is embedded in an electrically insulating layer 17, for example, a densified MgO powder. As shown in FIG. 5, the thermocouple pair 14 comprises two thermocouple wires 14, which are connected process-side at a measuring point, for example, on the blast furnace pipe 15. The skin thermocouple is welded to a weld pad 19, for example, by means of a TIG welding method. The weld pad 19 is secured, in turn, to the blast furnace pipe 15. On its other end, the skin thermocouple is connected to a connection terminal block 21 of a measurement transmitter. The connection terminal block 21 and/or measurement transmitter are accommodated in a connection head 20. The connection head 20 is affixed to the skin thermocouple by means of a press screw connection 16. The thermocouple wires 14 can be made of solid metal conductors such as copper, nickel, nickel chromium, etc. In case the thermo wires 14 could be damaged due to environmentally related influences, they are protected as known from the state of the art by a metal or ceramic, Kanthal for example, tube 18. Such a protective tube 18 can be secured, for example, to the skin thermocouple 20 by welding. In this way, the escape of a possibly aggressive medium through the protective tube 18 can be prevented. The weld seam 13 forms an additional sealing stage relative to the process medium in the (blast furnace) pipeline 15, so that this cannot escape. Protective tube 18 forms a first line of defense for the case in which the measuring arrangement is exposed to a strongly corrosive environment.

Additionally, a ceramic fiber 10 (also known as kaolin wool) is provided between the electrically insulating layer 17 and the protective tube 18. The ceramic fiber 10 forms a shell, which can also serve as insulation relative to a metal protective tube 18. The ceramic fiber 10 forms a second line of defense for the thermo wires 14 against a medium which can in some circumstances be strongly aggressive.

The measuring point shown in FIG. 5 for temperature measurement on the blast furnace pipe 15 is surrounded by a heat shield 11. The heat shield 11 protects the thermocouple from the action of environmentally related influences, which might otherwise bring about a corruption of the measurement signal or the measured value. As already mentioned, the thermo wires 14 embedded in an electrically insulating layer 17 are sheathed in a shell of ceramic fiber 10. The ceramic fiber 10 preferably comprises at least 60% $Al_2O_3$ and at least 20% $SiO_2$. Preferably, the ceramic fiber 10 comprises approximately 72% $Al_2O_3$ and approximately 28% $SiO_2$. By provision of the tubular shell comprising ceramic fiber 10, which sheaths the thermo wires 14 and the electrically insulating layer, an increased heat resistance of the skin thermocouple is achieved. The ceramic fiber 10 is fire resistant and can withstand temperatures of over 1000° C. The thermo wires 14 can also be surrounded by a metal protective layer 23, which represents a third line of defense against the medium. This metal protective layer is applied to the electrically insulating layer 17. Especially in the case in which the outer protective tube 18 is damaged, the shell of ceramic fiber 10 serves as protection for the thermo wires 14. The medium or other influences from the environment of the measuring apparatus are kept away from the thermocouple wires 14 by means of the ceramic fiber 10. The lifetime of the measuring apparatus is increased and systematic measurement errors are prevented through these precautionary measures. A metal only protective tube 18 has proved insufficient in field tests. The medium, heated in a kiln for example, cannot penetrate to the thermo wires 14 due to the ceramic fiber 10, especially in the case of damage to the outer metal protective tube 18. By the filtering effect of the ceramic fiber 10, the diffusion of the medium, for example, through the protective tube 18 and the electrical insulating layer 17 can additionally be prevented.

An additional protection against environmental influences by a sheathing of ceramic fiber 10 can analogously also be provided for the conductor elements 3 and/or the connection lines 2. As already mentioned, a sensor with connection lines 2 can be connected to the conductor elements 3 via the formed part 4. The conductor elements 3 and/or the connection lines 2 can then, for protection from environmentally related disturbing influences, be likewise sheathed in the same manner as the thermo wires 14, with the electrically insulating layer of a shell comprised of a ceramic fiber 10 surrounding them. In this way, an influencing, by diffusion, for example, of electrical voltage transmitted via the conductor elements 3 or connection lines 2 is prevented and the lifetime of the measuring arrangement is increased.

FIG. 6 shows, in enlarged representation, the weld pad 19 and the thermo wires 14, which are embedded in an electrically insulating layer 17, which electrically insulating protective layer 17 is surrounded by a metal protective layer 23.

The invention claimed is:

1. An industrial temperature measuring device, comprising:
at least one sensor element located in a cap;
at least one connection wire;
at least one conductor wire of a sheath line; and
at least one formed part,
wherein:
said sensor element is connected to said at least one connection wire, said sensor element serves for measuring temperature by evaluating a temperature dependent resistance of said sensor element, said sensor element is at least partially embedded in a potting compound, and said at least one connection wire of said sensor element extends out from the potting compound,
said cap is welded to an outer sheath of said sheath line,
said at least one conductor wire is connected to said at least one connection wire,
said at least one formed part at least partially comprises a ceramic and is cylindrical,
said at least one formed part has at least one opening for introduction of said at least one connection wire, and at least one opening for introduction of said at least one conductor wire,
said openings for introduction of said at least one conductor wire and said at least one connection wire open into at least one chamber section of said at least one formed part, and
said at least one connection wire and said at least one conductor wire meet in said chamber section and are electrically and mechanically connected,
wherein said at least one formed part has at least one contacting opening, which opens into said chamber section and through which said at least one connection wire and said at least one conductor wire are directly connected with one another.

2. The industrial temperature measuring device as claimed in claim 1, wherein:
said at least one opening for introduction of said at least one connection wire is conical, wherein the tip of the cone opens into said chamber section.

3. The industrial temperature measuring device as claimed in claim 1, wherein:
said at least one opening for introduction of said at least one conductor wire is V-shaped, wherein the tip of the V opens into said chamber section.

4. The industrial temperature measuring device as claimed in claim 1, wherein:
said at least one contacting opening is a bore, which reaches from an outer surface of said at least one formed part to said chamber section.

5. The industrial temperature measuring device as claimed in claim 1, wherein:
said at least one conductor wire is a single, or multiline, mineral insulated cable.

6. The industrial temperature measuring device as claimed in claim 1, wherein:
said at least one connection wire and/or said at least one conductor wire is at least sectionally sheathed by a ceramic fiber.

7. The industrial temperature measuring device as claimed in claim 6, wherein:
said at least one conductor wire is at least partially free of sheathing.

8. The industrial temperature measuring device as claimed in claim 1, wherein:
the geometry and shape of said at least one formed part is configured in a way such that that said at least one conductor wire of said sheath line is pre-bent into a V-shape as well as also the at least one connection wire are so positioned that they are laser welded to one another through said contacting opening.

9. An industrial temperature measuring device, comprising:
at least one sensor element located in a cap, which is connected to at least one connection wire, said sensor element serving for measuring temperature, by evaluating a temperature dependent resistance of said sensor element, said cap being welded to an outer sheath of a sheath line, said sensor element being at least partially embedded in a potting compound, said at least one connection wire of said sensor element extends out from the potting compound;

two conductor wires of the sheath line, which said two conductor wires are connected to said at least one connection wire; and at least one formed part, said at least one formed part at least partially comprises a ceramic and is cylindrical, wherein:

said at least one formed part has at least one opening for introduction of said at least one connection wire and at least one opening for introduction of said conductor wires, said openings for introduction of said conductor wires and said at least one connection wire open into at least one chamber section of said at least one formed part, and said at least one connection wire and said conductor wires meet in said at least one chamber section and are electrically and mechanically connected, wherein said at least one formed part has at least one contacting opening, which opens into said at least one chamber section and through which said at least one connection wire and said conductor wires are directly connected with one another.

10. The industrial temperature measuring device, as claimed in claim 9, wherein:

the geometry and shape of said at least one formed part is configured in a way such that that said at least one conductor wire of said sheath line is pre-bent into a V-shape as well as also the at least one connection wire are so positioned that they are laser welded to one another through said contacting opening.

* * * * *